(12) United States Patent
Faulkner et al.

(10) Patent No.: US 11,928,392 B2
(45) Date of Patent: *Mar. 12, 2024

(54) SPOOL SHEET GENERATION

(71) Applicant: EVOLVE MEP, LLC, Atlanta, GA (US)

(72) Inventors: Jason Faulkner, Atlanta, GA (US); Xiao Chun Yao, Marietta, GA (US); David Ronson, Atlanta, GA (US)

(73) Assignee: EVOLVE MEP. LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,034

(22) Filed: Feb. 4, 2022

(65) Prior Publication Data

US 2022/0156423 A1    May 19, 2022

Related U.S. Application Data

(63) Continuation of application No. 16/853,382, filed on Apr. 20, 2020, now Pat. No. 11,244,084.

(60) Provisional application No. 62/835,670, filed on Apr. 18, 2019.

(51) Int. Cl.
 *G06F 30/12*  (2020.01)
 *G06F 3/04847*  (2022.01)
 *G06F 3/0486*  (2013.01)

(52) U.S. Cl.
 CPC .......... *G06F 30/12* (2020.01); *G06F 3/04847* (2013.01); *G06F 3/0486* (2013.01)

(58) Field of Classification Search
 CPC .... G06F 30/12; G06F 3/04847; G06F 3/0486; G06F 2111/12; G06F 30/13
 See application file for complete search history.

(56) References Cited

U.S. PATENT DOCUMENTS

| | | |
|---|---|---|
| 7,039,569 B1 | 5/2006 | Haws |
| 7,856,342 B1 | 12/2010 | Kfouri |
| 8,762,877 B2 | 6/2014 | Loberg |
| 9,262,863 B2 | 2/2016 | Yadav |
| 10,325,035 B2 | 6/2019 | Kelly |
| 11,010,499 B2 | 5/2021 | De Backer |
| 2002/0018061 A1 | 2/2002 | Gantt |
| 2006/0247902 A1 | 11/2006 | Rourke |
| 2007/0088530 A1 | 4/2007 | Erignac |
| 2008/0275674 A1 | 11/2008 | Reghetti |

(Continued)

OTHER PUBLICATIONS

Autodesk, Inc. "Revit Structure 2011 User's Guide". Apr. 2010. 1812 pages. pp. 1146-1150.*

(Continued)

*Primary Examiner* — Michael Roswell
(74) *Attorney, Agent, or Firm* — Clayton, McKay & Bailey, PC

(57) ABSTRACT

Examples can include a system for generating a spool sheet. A user can select multiple components on a graphical user interface ("GUI"). Then they can select an option to create a spool sheet. The system can determine a list of components in the selection for use in a bill of materials. This can be included in a spool page that includes a printable spool sheet region. Within the spool sheet region, the GUI can display a view of the selected components at a location indicated by an anchor node of the template.

20 Claims, 10 Drawing Sheets

(56) References Cited

U.S. PATENT DOCUMENTS

| | | |
|---|---|---|
| 2010/0318929 A1 | 12/2010 | Hilton |
| 2011/0251975 A1 | 10/2011 | Evans |
| 2013/0132040 A1 | 5/2013 | Shook |
| 2014/0164072 A1 | 6/2014 | Kulusjarvi |
| 2015/0029181 A1 | 1/2015 | Lerey |
| 2015/0135793 A1 | 5/2015 | Plummer |
| 2015/0142157 A1 | 5/2015 | Daugherty |
| 2015/0346950 A1 | 12/2015 | Hilton |
| 2016/0117418 A1 | 4/2016 | Baardse |
| 2017/0032057 A1 | 2/2017 | Garimella |
| 2018/0247002 A1 | 8/2018 | Mendez |
| 2019/0042669 A1 | 2/2019 | De Backer |
| 2019/0370419 A1 | 12/2019 | Ronson |
| 2020/0210638 A1 | 7/2020 | Cho |

OTHER PUBLICATIONS

Sandberg, Jonas, Computer based tools in the HVAC design process. Interface and data transfer between modeling in Revit and supporting draw-and simulation tools, (especially with focus on handling geometries and information—/data transfer). MS thesis, 2011.

Sheward, Hugo, et al., Preliminary Concept Design (PCD) Tools for Laboratory Buildings, Automated Design Optimization and Assessment Embedded in Building Information Modeling (BIM) Tools, 2011.

Autodesk Revit 2015 Getting Started Guide.

Revit Architecture User's Guide, 2011.

Victaulic Tools for Revit, Revit 2014, 2015 and 2016.

"Autodesk, Inc.", "Revit Structure 2011 User's Guide". Apr. 2010. 1812 pages. pp. 36, 587, 684, 771-774. 789, 887-888, 966, 977-983, 1004, 1011, 1633-1634, 1643.

Agapaki, Eva, et al., "Prioritizing object types for modelling existing industrial facilities", Automation in Construction 96 (2018): 211-223.

Li, Xiaodan, et al., "Modular and Offsite Construction of Piping: Current Barriers and Route", Applied Sciences 7.6 (2017): 547.

Palmer, Mark E., et al., "3D Piping IGES Application Protocol Version 1.0", National Institute of Standards and Technology, U.S. Department of Commerce, Feb. 24, 1993.

Son, Hyojoo, et al., "As-built data acquisition and its use in production monitoring and automated layout of civil infrastructure: A survey.", Advanced Engineering Informatics 29.2 (2015): 172-183.

\* cited by examiner

SPOOL BOM 240

| # | QTY | SIZE | DESCRIPTION | MATERIAL | LENGTH |
|---|---|---|---|---|---|
| 79 | 1 | 1-1/2"x1-1/2"x3/4" | NoWT-600-TEE (RED-C) | COPPER | 0'-0 7/8" |
| 78 | 1 | 3/4" | NoWE-500-ELBOW 90 (C) | COPPER | |
| 84 | 1 | 1-1/2" | NoWE-500-ELBOW 90 (C) | COPPER | |
| 579 | 1 | 1-1/2" | TYPE L COPPER PIPE | COPPER | 3'-11 9/32" |
| 578 | 1 | 3/4" | TYPE L COPPER PIPE | COPPER | 0'-7 9/16" |
| 582 | 1 | 3/4" | TYPE L COPPER PIPE | COPPER | 8'-8 1/8" |
| 577 | 1 | 1-1/2" | TYPE L COPPER PIPE | COPPER | 4'-10 11/16" |
| 575 | 1 | 1-1/2" | TYPE L COPPER PIPE | COPPER | 29'-6 15/32" |

SPOOL WELDS 242

| WELD NO | SIZE | WELDER NAME | WELDER ID | WLDER SIGNATURE |
|---|---|---|---|---|

*FIG. 2C*

SPOOL SHEET GENERATION

CROSS-REFERENCE TO RELATED APPLICATION

This application is a continuation of and claims priority to U.S. patent application Ser. No. 16/853,382, titled "SPOOL SHEET GENERATION," filed Apr. 20, 2020, which claims the benefit of and priority to U.S. Provisional Application No. 62/835,670, filed on Apr. 18, 2019, titled "SPOOL SHEET GENERATION," the contents of which are hereby incorporated herein by reference in their entirety.

BACKGROUND

Computer-aided design ("CAD") software allows users to design structures for construction, among other things. One type of CAD software is Building Information Modeling ("BIM") software, which allows users to elaborately design three-dimensional structures. AUTODESK REVIT is one type of BIM software that can be used to design complex buildings all the way down to components and assemblies for use in a project. For example, a user can model an entire plumbing or electrical installation within a building. Doors, windows, and other reversible components can also be laid out in REVIT.

CAD programs have the concept of assemblies (also referred to as spools in the fabrication space). Assemblies are groupings of construction elements/parts that can be pre-assembled either at the construction site or in a fabrication shop and then treated as a single unit for the purposes of installation. Once an assembly is defined in a CAD application it can be reused in other locations within the design thus allowing for quicker design. CAD applications allow for the user to manually create a Build of Materials ("BOM") which lists the parts that make up the spool. CAD applications also allow for the manual creation of views of a spool which can be used during the assembly of the spool. A main purpose a spool sheet is to assist users in the field in putting together the assembly.

However, current graphical user interfaces do not provide an easy way to create spool sheets. Often, the manual creations are inconsistent and do not provide the right break down of parts included in an assembly. Additionally, it may be impossible for a user to even determine the correct parts based on the assembly. This process wastes time and non-standardized output across designers causes errors in part ordering.

For at least these reasons, a need exists for spool sheet generation.

SUMMARY

The examples described herein specifically address technical problems and limitations of REVIT and similar BIM software. The examples include a computing device, such as a personal computer, tablet, or laptop, that executes a computer-aided design application such as REVIT. The application can include an application programming interface ("API") that interacts with a plugin that supplies additional functionality for spool sheet creation. The plugin can allow a user to define one or more templates from which a spool sheet is generated. The template can specify different views of the selected components.

The template can allow the plugin to populate and the GUI to display a spool page. The spool page can include a printable spool sheet region that includes what will be printed. Outside of this region, additional views can be included based on the template. The template can include anchor nodes. The anchor nodes can specify which view of the assembly to display at the location of the respective anchor node. The user can drag these views into the region if the user desires any of them for printing with the spool sheet. This can help a user quickly create spool sheets with the most appropriate angles for constructing the assembly.

In one example, the CAD application receives a selection of an assembly on a graphical user interface ("GUI"). The assembly can be a collection of multiple components. The components can be selected, such as by drawing a box around them. The components can already be associated with another and defined as an assembly in one example. In another example, the act of selecting the multiple components can define the assembly.

The user can then select a GUI input to create a spool sheet. This can include clicking a spool sheet button or menu item that is provided by the plugin and displayed within the GUI. The plugin can use API commands to cause the GUI input to display. The GUI input can trigger functions in the plugin for creating the spool page with a printable spool sheet region. In one example, in response to the GUI input, the plugin determines a list of the components in the selection. This can include keeping and eliminating components based on component type. The component types can be compared to whitelists or blacklists. This can help remove components that do not map to real-world parts needed for building the assembly, in an example.

The GUI can display a spool page based on a spool template used by the plugin. The spool template can be selectable by the user and even defined by the user in an example. The resulting spool page shown on the GUI can include a printable spool sheet region. In one example, printing the screen will result in printing the spool sheet region but not areas outside the spool sheet region yet still within the spool page. Within the spool sheet region, a first view of the assembly can be provided at a location indicated by an anchor node. The anchor node can be placed in the template and can be set to have a particular view of the assembly, such as front, back, side, or elevation.

The template can cause additional views of the assembly to be displayed outside of the spool region. For example, anchor nodes outside the spool region can specify different views of the assembly. This can allow the user to quickly locate and drag any desirable views into the spool region.

The plugin can also cause the spool page to display the list of components, such as a BOM list. This can include keeping and eliminating components based on component type. The component types can be compared to whitelists or blacklists. This can help remove components that do not map to real-world parts needed for building the assembly, in an example.

The template can be selected from multiple user-defined templates in an example. The templates can have different default views and positions. Different views of the assembly can default to being within the spool region, for example. Templates can be specially defined for certain families of components or assemblies that are known to best display with particular views.

Examples can include a system for generating a spool sheet. A user can select multiple components on a graphical user interface ("GUI"). Then they can select an option to create a spool sheet. The system can determine a list of components in the selection for use in a bill of materials. This can be included in a spool page that includes a printable spool sheet region. Within the spool sheet region, the GUI can display a view of the selected components at a location indicated by an anchor node of the template.

The method can be performed by a system in an example. The method can also be implemented based on code stored on a non-transitory, computer-readable medium, which is read and executed by a process of a computing device. While a plugin is referred to in several examples, the same functionality can be built into the application that uses the plugin in those examples.

BRIEF DESCRIPTION OF THE DRAWINGS

FIG. 2C is an example illustration of a Spool BOM.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

An example system can incorporate a plugin that allows a designer to define a template for a spool page. The template can specify two-dimensional ("2D") and three-dimensional ("3D") views of the assembly (i.e., spool) as well as BOM lists of the parts that makeup the spool. The template can have a spool region that prints as a spool sheet in addition to other views outside of this region that can be dragged into the spool region for easy customization. The spool sheet can be printable and BIM compatible.

In one example, the location of the 2D/3D views on the sheet are controlled by the placement of anchor nodes on the template. The anchor nodes can specify location for a view of the assembly. The anchor nodes can also specify the perspective of the view itself. Anchor nodes also can contain properties that control the generation of the view.

In one example, the anchor node contains a property to toggle whether the view is placed on the sheet. If the view isn't placed on the sheet it is still created but can be outside of the printable spool region. In one example, the user can drag anchor nodes to the locations where the assembly will be generated on the spool page, including inside and outside of the printable spool region. This is useful in instances where different views are needed on the sheet depending on which consumer will receive the spool sheet. Views that were generated but not placed on the sheet can be easily added to the sheet later, such as by dragging them into the printable region.

The plugin can cause the GUI to display a populated version of the template, called the spool page. Then from that page, the user can print a spool sheet with the desired views and a BOM list.

Figure 1A:
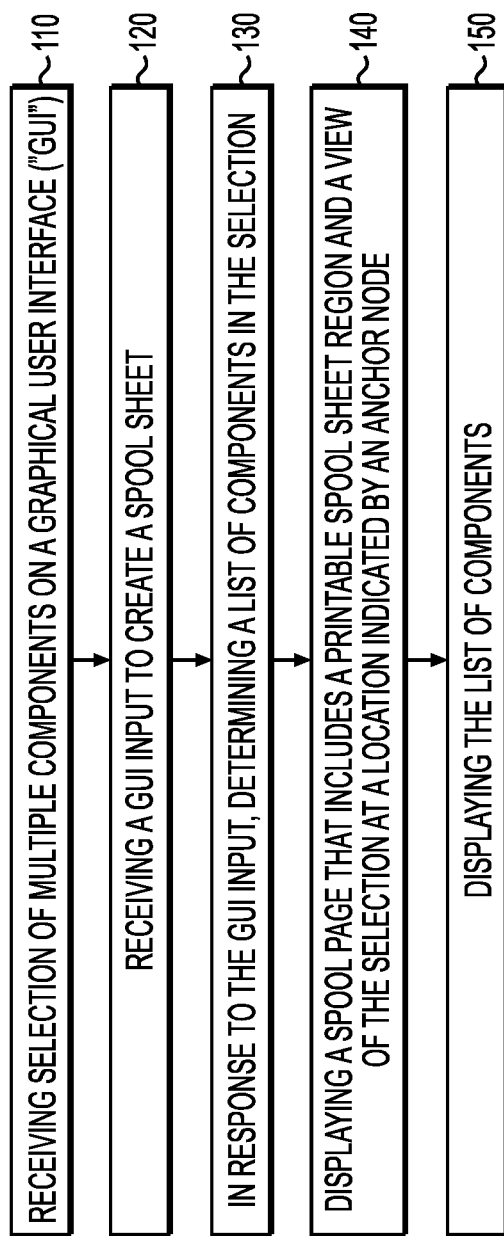
FIG. 1A is an example flow chart showing example stages for creating a spool sheet in a computer-aided design application, such as REVIT.

FIG. 1 is an example illustration of method stages performed in an example. At stage 110, the GUI can receive selection of multiple components. For example, the user can draw a box around multiple components of one or more assemblies. Alternatively, the user can select one or more assemblies that contain multiple components.

At stage 120, GUI can receive an input to create a spool sheet. This can be a selection in a drop-down menu or a button press. These elements can be provided on the GUI based on code in the plugin, in an example. For example, API methods in REVIT can be called or extended by the plugin code.

At stage 130, in response to the input, the plugin can determine a list of components in the selection. This can include traversing the components to determine which are connected. It can also include breaking down selected assemblies to core components. The components can be compared against a whitelist to determine which ones to keep in the list. For example, although a weld may technically be a component, it may not need to appear on a spool sheet. Therefore, the whitelist can be used to represent components that should appear, in an example. Alternatively, the whitelist can include components that should not exist, and can therefore be used to remove components from the selection.

At stage 140, the GUI can display a spool page that includes a printable spool sheet region that includes at least one view of the assembly. The views can be based on one or more anchor nodes in a spool template. The anchor nodes can determine which views, such as angles or dimensionality, are displayed in the spool sheet region. In one example, the user can build spool templates and choose which ones the plugin uses to create the spool page. The spool page can also include multiple other views outside the spool sheet region. When the user prints the page, only the spool sheet region prints, in an example. However, the additional views can be dragged into the spool sheet region prior to printing, in an example.

In one example, the anchor node also contains a property to toggle whether item number tags are placed on the elements of the assembly. Item number tags can be displayed on each part of the assembly. The item numbers themselves can be chronological or map to item IDs in the CAD model. This can allow a fabricator to know which parts go where when assembling the spool (constructing the assembly).

The anchor node can also be set to ignore some element types (i.e., part types) when placing number tags. For example, it is possible for every screw, nut, bolt, washer, and weld to have an item number in the CAD model. However, displaying these would clutter the view, making it unreadable. Based on a blacklist (e.g., an ignore list), the view generation process can skip tagging any element type in the list.

In one example, the anchor nodes can also specify whether to place continuation tags. Continuation tags can identify parts or assemblies that the current assembly (spool) will be connected to during the installation process. This can give a fabricator context for how to use or install the assembly within the larger context of a job.

The anchor node can also contain a property to toggle whether dimensions are displayed on the view rendering. These dimensions can be computed automatically during the view generation process. The dimensions can be based on industry standard dimensioning practices for the particular part type being dimensioned.

At stage 150, the GUI can display the list of components. These can be displayed as part of a Spool BOM, in an example. The spool template can place the list of components within the spool sheet region. This can ensure that the list of components prints with the spool sheet. In one example, a whitelist or blacklist is used to limit which components are listed in the BOM. For example, existing welds can be omitted to make construction less confusing.

The location of the BOM on the sheet can also controlled by anchor nodes in the template. The anchor nodes can specify that the BOM should be created but not placed on the sheet, in an example. This can allow for vendor specific BOM lists to be generated along with the spool sheet rather than manually after the fact. In one example, different whitelists and blacklists can be used for different BOM lists. This can allow the template to have, for example, two different BOM lists with differing levels of detail. The user can drag either of the BOM lists into the printable spool region prior to generating the spool sheet.

Figure 1B:
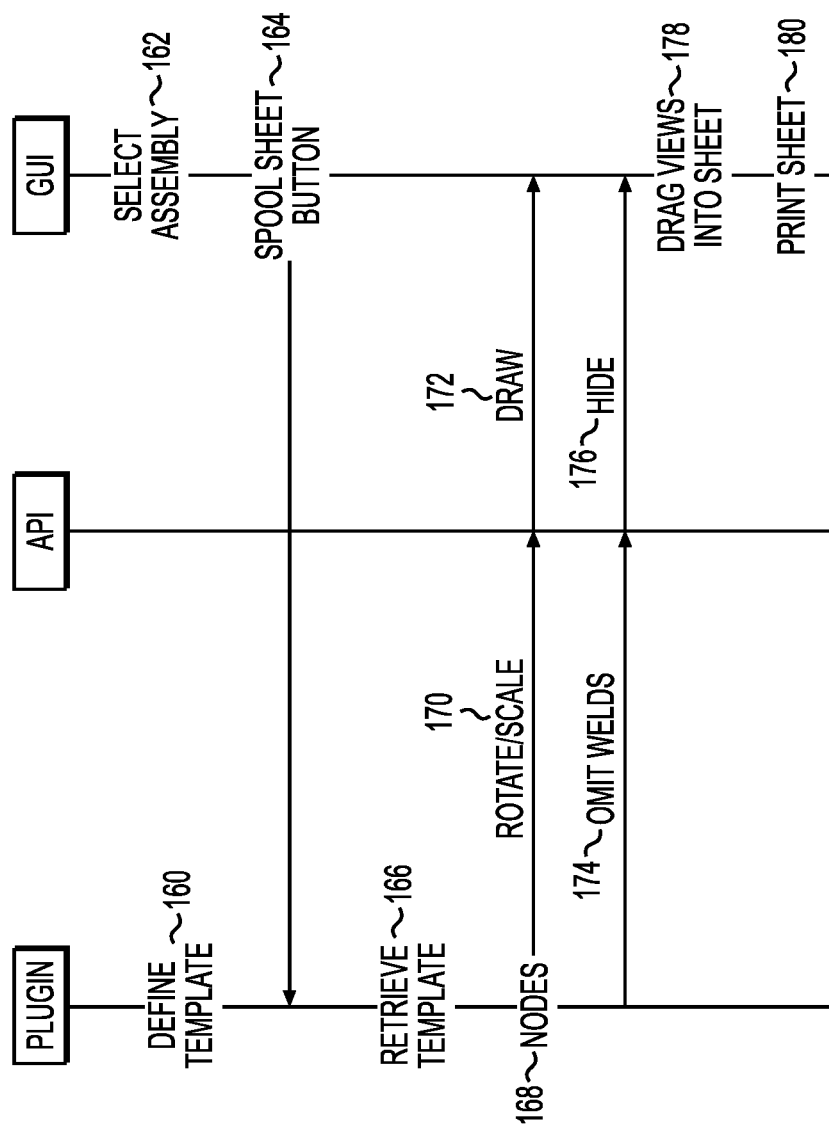
FIG. 1B is an example sequence diagram for spool sheet creation.
Figure 3A:
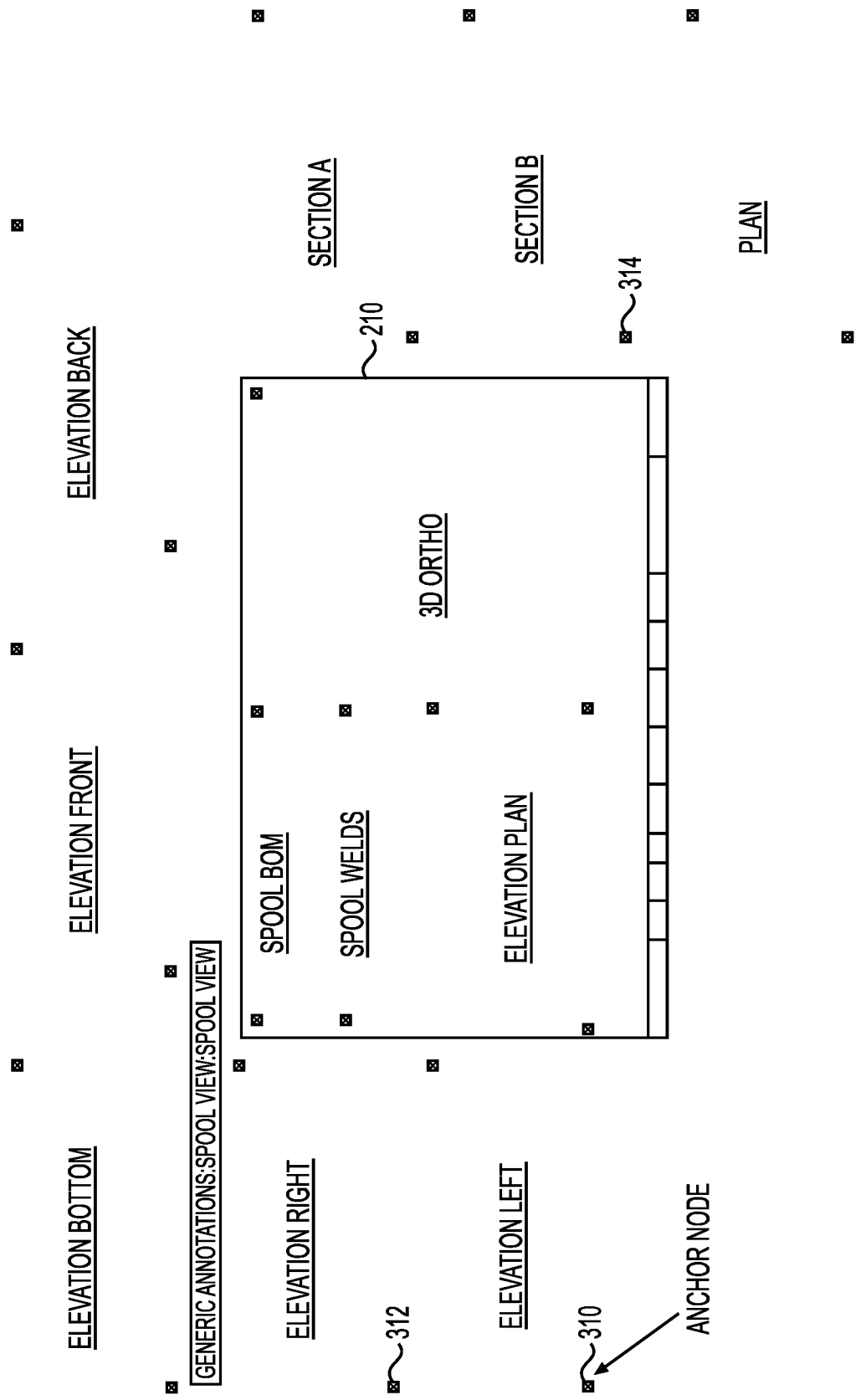
FIG. 3A is an example illustration a spool template.

FIG. 1B is an example sequence diagram for spool sheet generation. At stage 160, the plugin can allow the user to define a template. The plugin can do this by providing a define template option on the GUI through use of the API. Selecting the option can bring up a template creation screen, such as shown in FIG. 3A. The user can position labels and anchor nodes on the template. The user can also change attributes of the anchor nodes to impact what will be displayed there. Anchor nodes can specify views of the assembly (e.g., the selected components). The anchor nodes can also be used for building a BOM list at a location with particular blacklists, in an example.

At stage 162, a user can select an assembly on the GUI, such as by clicking on or drawing a square around one or more components. To create a spool from those components, the user can select a spool sheet button at stage 164. The spool sheet button can be provided by the plugin and call functionality for creating the spool page using the template.

At stage 166, the plugin can retrieve the template for use on the spool page. In one example, the user is prompted to select between multiple available templates. These can include user-customized templates, in an example.

At stage 168, the plugin can read the retrieved template and determine what to place on the spool page based on anchor nodes in the template. Each anchor node can specify either a view of the assembly or a BOM list. The anchor nodes can specify the detail with which to present the assembly. For example, superfluous components can be omitted from display. Labels can be applied to a subset of the components. Part numbers that link over to the BOM list can be applied. All of these things can be properties of the anchor node, set in advance during template creation at stage 160, in an example.

Based on an anchor node, the plugin can instruct the GUI to draw the assembly at a particular rotation and scale at stage 170. This can include making an API call to cause the GUI to draw the assembly from the desired view at stage 172. Labels can also be drawn. In one example, the plugin loops through parts in the assembly and determines whether to draw item labels for the parts. These labels can correspond to the BIM, allowing a fabricator to more easily build the assembly.

As part of this process, the plugin can omit welds and other nonessential elements at stage 174. This can cause the GUI to hide part numbers for those elements at stage 176.

This process can be repeated for each anchor node. Then the user can drag desired views into the printable spool region at stage 178. Effectively, this is like allowing the user to drag whichever view they want onto the spool sheet. Then, at stage 180, when the user selects a print option, the plugin can cause the BIM application to print the spool region as the spool sheet. The spool region can include a BOM list and whichever views defaulted or were dragged into the spool region.

Figure 2A:
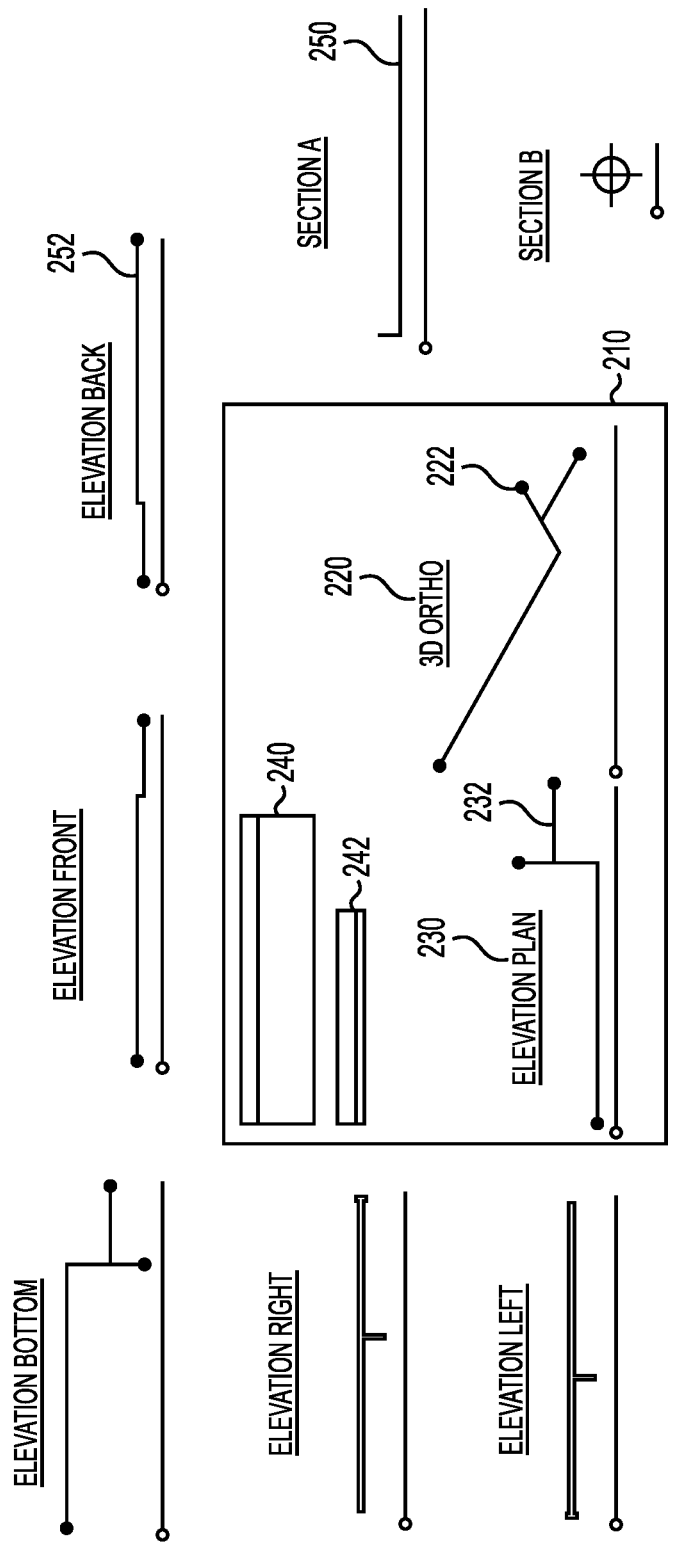
FIG. 2A is an example illustration of a spool page.

FIG. 2A illustrates an example spool page. A spool sheet region 210 can be the printable region of the spool page. In this example, the spool region 210 includes a first view 222 and a second view 232 of the selected components (i.e., the assembly). The views 222, 232 can also include labels 220 and 230, respectively. The labels 220, 230 can describe the perspective shown by the respective view 222, 232 of the assembly.

The spool sheet region 210 can also include a Spool BOM 240 and a list of omitted components 242. This can allow the fabricator to better understand what they are looking at.

Outside the spool sheet region 210, several other views (such as views 250, 252) are included. These also have their own labels, as specified by the spool sheet template. The template can specify these other views at various anchor points. The anchor points can specify dimensional aspects, such as rotation, zoom, and whether to present the selected components as two-dimensional or three-dimensional. The user can drag one or more of these additional views onto the spool sheet region for easy modification of the printable spool sheet. The labels can be tied to the views, causing them to also drag with the views.

In one example, the user can print the spool sheet region 210. The views 252, 250 outside of the spool sheet region 210 can be omitted from printing, in an example. However, everything within the spool region 210 can be printed as the spool sheet, in an example.

Figure 2B:
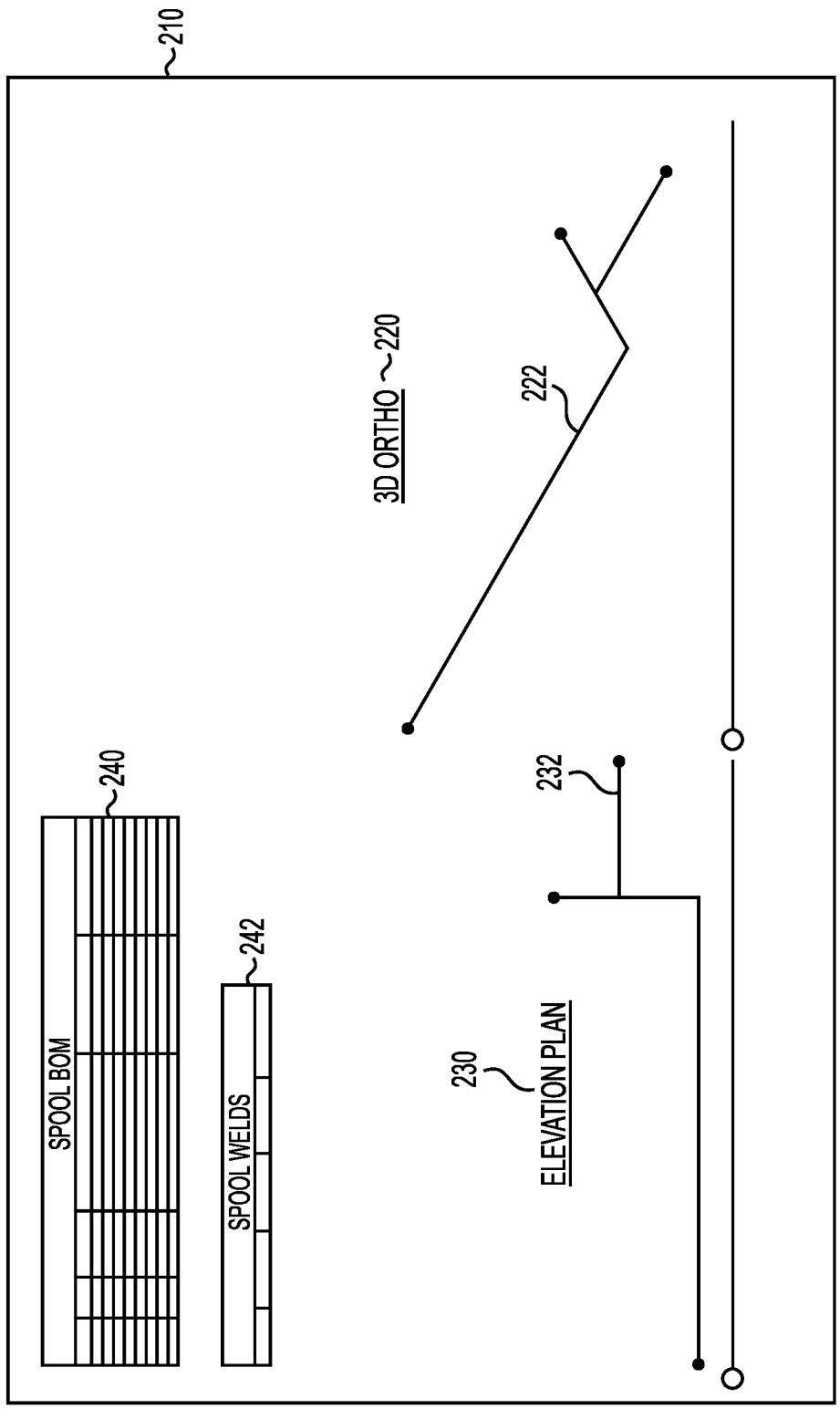
FIG. 2B is an example illustration of a printable spool sheet region.

FIG. 2B is a view of what would actually print based on the example of FIG. 2A. As shown, only the spool sheet region 210 would print in this example.

FIG. 2C is an example zoomed-in view of the Spool BOM 240, which includes the list of components in the spool. As shown, the detail of the components can be sufficient for a fabricator to understand which components make up the assembly. In this example, the detail includes a part number (#), quantity (QTY), size of the part, and description of the part. The BOM list 240 also indicates the material that the part is made of and, where applicable, the length of the part.

The omitted component list 242 can list components that are not included in the Spool BOM but were technically selected by the user. The list can include blacklisted component types, such as welds. The columns can be based on the blacklisted component type. For example, the columns describing omitted welds can differ from the columns describing omitted nuts, bolts, or bends.

Figure 2D:
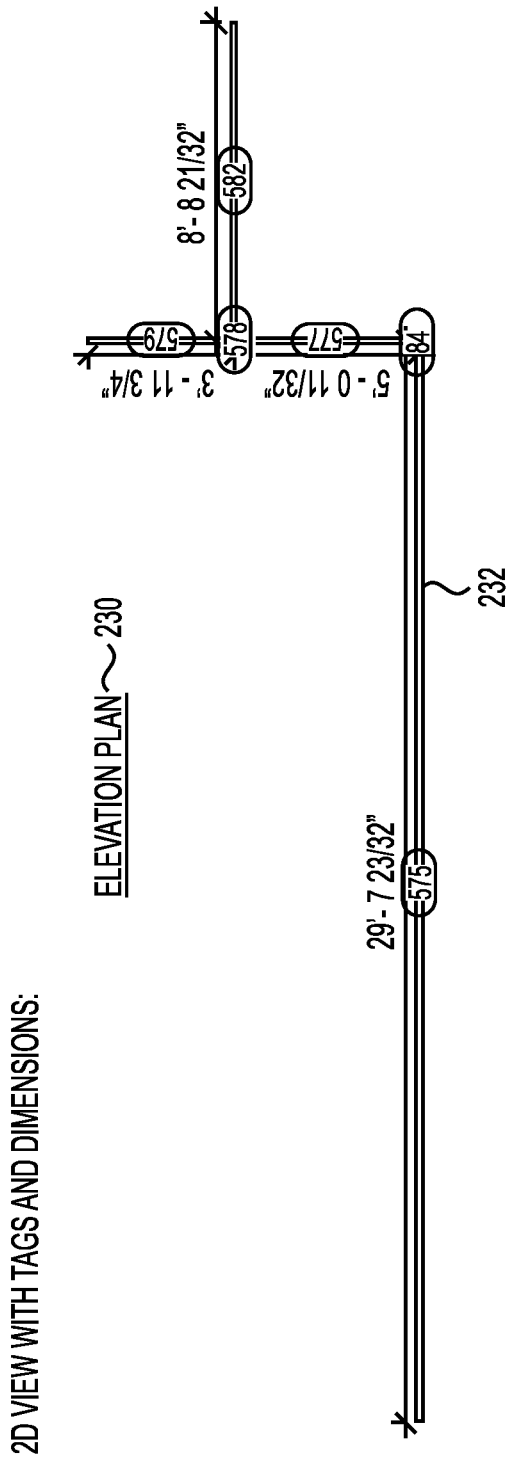
FIG. 2D is an example illustration of a two-dimensional spool view.

FIG. 2D is an example close-up illustration of view 232 from in the spool sheet region 210 of FIGS. 2A and 2B. As shown, the label 230 indicates this is an elevation plan view. The assembly itself can comprise part 575, 84, 557, 578, 579, and 582. The corresponding anchor node of the template can cause these part numbers to display on top of the parts. These part numbers can correspond to the part numbers in the BOM list 240. In this example, the part numbers are shown in FIG. 2C, providing the fabricator with detail about each labelled part of the assembly.

Additionally, an anchor node parameter can indicate that dimensions should be shown. The plugin can determine dimensions based on the part type, and display those in the view 232. In this example, length dimensions of each pipe 575, 557, 578, 579, and 582 are shown. However, the dimensions of elbow 84 are not shown. This can be because the anchor node whitelists pipes for dimensions but not elbows. As a result, the dimensions are drawn for the pipes but not the elbow.

In one example, the anchor nodes can be set to activate certain parameters, such as part numbers and dimensions, when the anchor node is within the printable spool region 210. This can allow the spool page to remain less cluttered with information. However, when a user drags a view 252 into the spool region 210, the plugin can then notify the GUI to draw the part numbers and dimensions.

FIG. 3A is an example illustration of a spool sheet template. The x-out squares represent anchor nodes for view placements. Example anchor nodes 310, 312, 314 are labelled but the x-out squares all represent anchor nodes in this example. Some anchor nodes are within the printable spool region 210 and some are not. In one example, the anchor nodes indicate the default drawing location of the assembly. Each anchor node can also reflect a different view or different parameter combinations for part numbers and dimension measurements. This can allow the user to have a template with many different perspectives of the assembly, along with different treatments of those views.

The anchor nodes can include dimensional characteristics to provide different views of the selected components. This can allow the user to quickly assess other useful views and drag them into the spool sheet region 210 if desired.

Figure 3B:
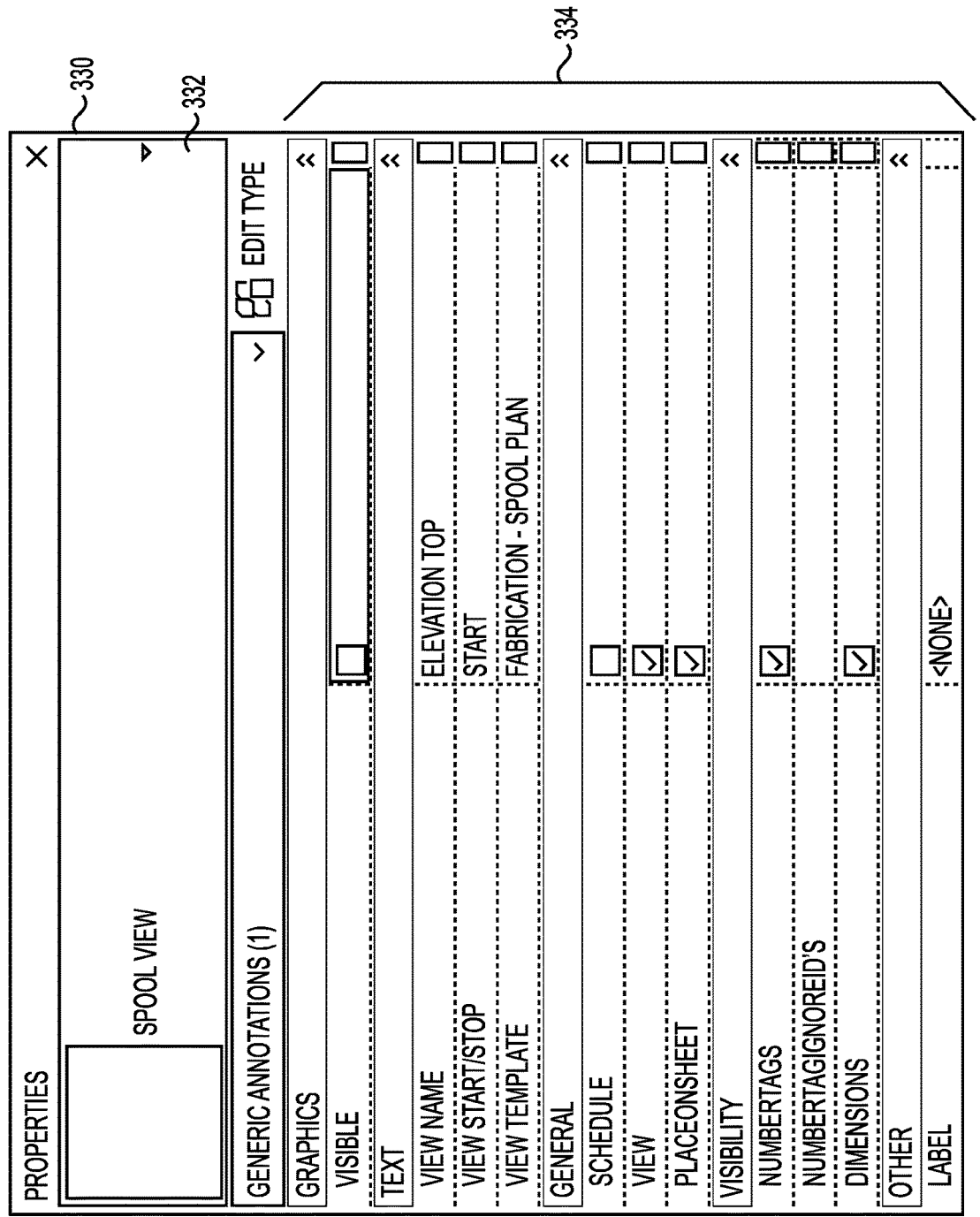
FIG. 3B is an example illustration of a GUI for creating a spool view.

FIG. 3B is an example illustration of a GUI window 330 for creating a view 332 of an assembly that can be assigned to an anchor node in a template. The view 332 can have a name, can be assigned to one or more templates, and can have various settings 334 with regard to which graphics are visible on the GUI.

For example, the view 332 can be selected as visible or not, in an example. This can determine whether the view 332 starts off within the printable spool region 210 or not. The view 332 can also have a name, such as "elevation top," that can display in a label with the view 332. A visibility section can allow the user to specify whether to show part numbers (numbertags), whether to ignore some part numbers, and whether to draw dimensions.

In one example, an example view of the spool can be drawn in the box next to SPOOL VIEW. The user can manipulate the view in that box by turning the assembly in any direction. This can allow the user to specify custom perspectives for the view 332, in an example.

Figure 4A:
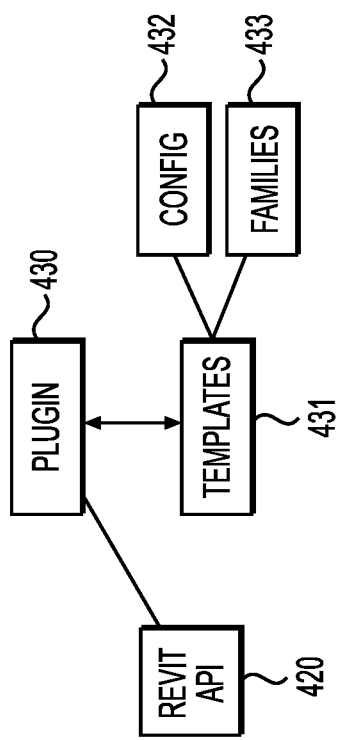
FIG. 4A is an example illustration of system components.

FIG. 4A is an illustration of example system components used in communication between REVIT and the plugin. The plugin 430 communicates with REVIT using the REVIT API 420. This can include implementing methods of the API 420 to divert functionality to the plugin. For example, custom drop-down list items can be added for creating the spool sheet. The functionality for doing so can be carried out, in part, in the plugin 430. The plugin 430 can access spool sheet templates 431. The spool sheet templates 431 can be numerous and selected for particular applications, such as ordering parts or building assemblies in the field. The templates 431 can include configuration information for particular component families 433 (e.g., assemblies). This can mean that different templates 431 are available for different selected assemblies 433. Configuration information 432 can drive the plugin 430 in making these selections. The plugin 430 can select a template 431 based on the assembly 433 selected at stage 110, for example.

The templates 430 and configuration information 432 can be stored inside or outside of REVIT, depending on the example. They can be stored within a non-transitory, computer-readable medium, such as a solid-state drive of a laptop that the user is running REVIT on.

Figure 4B:
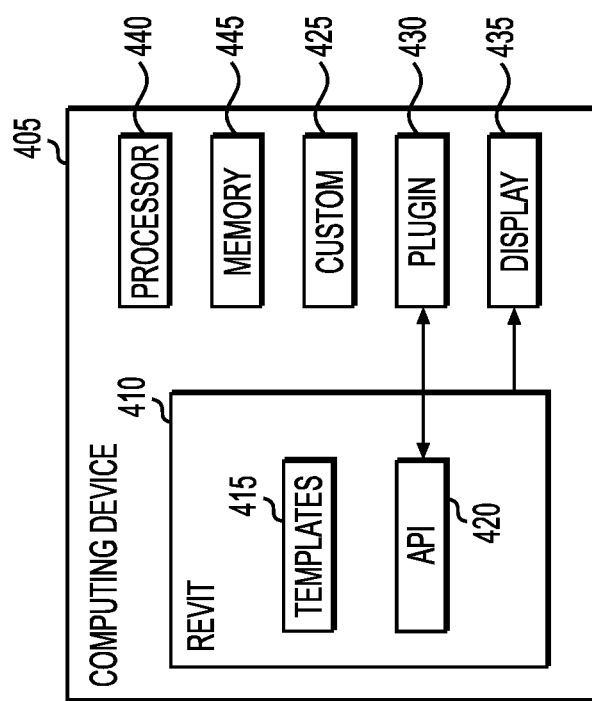
FIG. 4B is an example illustration of system components.

FIG. 4B is an illustration of example system components. The computing device 405 can be any processor-based device, such as a personal computer, workstation, server, phone, tablet, or laptop. The computing device 405 can include a processor 440 and memory 445. The processor 440 can be one or more physical processors that are local to the computing device 405 or virtual computer processing units that are accessed remotely. The memory 445 can be non-transitory and can store instructions for execution by the processor 445.

The processor 440 can run a computer-aided design application, such as REVIT 410. REVIT 410 can include templates 415 for creating spool sheets that show which parts comprise an assembly. These can be generic parts and assemblies. Alternatively, custom parts and assemblies 425 can be utilized.

REVIT 440 can also generate a GUI for use with a display 435. The display 435 can be any type of screen and can be integrated into the computing device 405 or separate from the computing device 405.

REVIT 440 can utilize the plugin 430 to add functionality. The plugin 430 can make API 420 calls to REVIT to integrate itself within the workflow. This can include altering the GUI and providing additional functional items, such as menu items and buttons, for use with the spool sheet creation. The plugin 430 can receive information, such as part identifiers, from REVIT 410, and place the corresponding assembly onto the spool page in various views specified by the template 415. The plugin 430 can also create a spool sheet, in an example.

In one example, the plugin 430 accesses dimensioning rules to determine which dimensions to display and how to calculate them. The dimensioning rules can be keyed to part or assembly identifiers in an example. A database, either local or remote from the computing device 405, can store the dimensioning rules and be accessed by the plugin 430.

In one example, a dimensioning engine can perform the various stages performed by the plugin. The dimensioning engine can interpret the dimensioning rules, measure dimensions, and create a spool sheet with views of the part assembly and various dimensions shown.

Although a plugin is described in some examples, the computer-aided application, such as REVIT, can alternatively build the described functionality directly into the application. The examples can still apply to that scenario as well. Additionally, though REVIT is referred to for convenience, the examples can also function with any other computer-aided design application.

Other examples of the invention will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

What is claimed is:

1. A method for spool sheet generation, comprising:
receiving a selection of an assembly on a graphical user interface ("GUI"), the assembly including multiple components;
determining a list of the components in the selection; and
displaying a spool page on the GUI that is organized as specified by a spool template, the spool template causing the spool page to include:
a printable spool sheet region;
multiple views of the assembly at different angles, wherein the multiple views are simultaneously displayed outside of the spool sheet region at locations specified by the spool template, and wherein the multiple views include at least three draggable copies of the assembly at different perspectives,
wherein printing causes the printable spool region to print without the multiple different angle views that are not within the printable spool region at a time of printing.

2. The method of claim 1, wherein the spool template includes a first anchor node that causes a first view of the assembly to display within the printable spool sheet region, and wherein the multiple views are placed at additional anchor nodes specified in the spool template, the additional anchor nodes being outside the spool sheet region and specifying a perspective of the assembly.

3. The method of claim 2, wherein a configurable setting specifies whether the first view is two-dimensional or three-dimensional.

4. The method of claim 1, wherein the spool template includes labels that describe the multiple views at corresponding anchor nodes and dimensioning characteristics associated with the anchor nodes.

5. The method of claim 1, wherein the spool template is selectable on the GUI from a plurality of different spool templates.

6. The method of claim 1, wherein the list of components prints with the spool sheet region.

7. The method of claim 6, wherein determining the list of components includes comparing component types of the components to a whitelist or blacklist of types, and wherein at least one component of the assembly is omitted from the list of components based on the comparison.

8. A non-transitory, computer-readable medium containing instructions for spool sheet generation, wherein a processor executes the instructions to perform stages comprising:
receiving a selection of an assembly on a graphical user interface ("GUI"), the assembly including multiple components;
determining a list of the components in the selection; and
displaying a spool page on the GUI that is organized as specified by a spool template, the spool template causing the spool page to include:
a printable spool sheet region;
multiple views of the assembly at different angles, wherein the multiple views are simultaneously displayed outside of the spool sheet region at locations specified by the spool template, and wherein the multiple views include at least three draggable copies of the assembly at different perspectives,
wherein printing causes the printable spool region to print without the multiple different angle views that are not within the printable spool region at a time of printing.

9. The non-transitory, computer-readable medium of claim 8, wherein the spool template includes a first anchor node that causes a first view of the assembly to display within the printable spool sheet region, and wherein the multiple views are placed at additional anchor nodes specified in the spool template, the additional anchor nodes being outside the spool sheet region and specifying a perspective of the assembly.

10. The non-transitory, computer-readable medium of claim 9, wherein a configurable setting specifies whether the first view is two-dimensional or three-dimensional.

11. The non-transitory, computer-readable medium of claim 8, wherein the spool template includes labels that describe the multiple views at corresponding anchor nodes and dimensioning characteristics associated with the anchor nodes.

12. The non-transitory, computer-readable medium of claim 8, wherein the spool template is selectable on the GUI from a plurality of different spool templates.

13. The non-transitory, computer-readable medium of claim 8, wherein the list of components prints with the spool sheet region.

14. The non-transitory, computer-readable medium of claim 13, wherein determining the list of components includes comparing component types of the components to a whitelist or blacklist of types, and wherein at least one component of the assembly is omitted from the list of components based on the comparison.

15. A system for spool sheet generation, comprising:
a processor that executes instructions for running a design application having an application programming interface ("API");
a memory that includes code for a plugin, the plugin interacting with the API to cause the processor to perform stages including:
receiving a selection of an assembly on a graphical user interface ("GUI"), the assembly including multiple components;
determining a list of the components in the selection; and
displaying a spool page on the GUI that is organized as specified by a spool template, the spool template causing the spool page to include:
a printable spool sheet region;
multiple views of the assembly at different angles, wherein the multiple views are simultaneously displayed outside of the spool sheet region at locations specified by the spool template, and wherein the multiple views include at least three draggable copies of the assembly at different perspectives,
wherein printing causes the printable spool region to print without the multiple different angle views that are not within the printable spool region at a time of printing.

16. The system of claim 15, wherein the spool template includes a first anchor node that causes a first view of the assembly to display within the printable spool sheet region, and wherein the multiple views are placed at additional anchor nodes specified in the spool template, the additional anchor nodes being outside the spool sheet region and specifying a perspective of the assembly.

17. The system of claim 16, wherein a configurable setting specifies whether the first view is two-dimensional or three-dimensional.

18. The system of claim 15, wherein the spool template includes labels that describe the multiple views at corresponding anchor nodes and dimensioning characteristics associated with the anchor nodes.

19. The system of claim 15, wherein the spool template is selectable on the GUI from a plurality of different spool templates.

20. The system of claim 15, wherein the list of components prints with the spool sheet region.

\* \* \* \* \*